(12) United States Patent
Waki et al.

(10) Patent No.: US 8,371,756 B2
(45) Date of Patent: Feb. 12, 2013

(54) JOURNAL BEARING

(75) Inventors: Yuichiro Waki, Tokyo (JP); Takashi Nakano, Tokyo (JP); Takaaki Kaikogi, Hyogo (JP); Motohisa Uesato, Aichi (JP); Shigetoshi Nakamura, Aichi (JP)

(73) Assignees: Mitsubishi Heavy Industries, Ltd., Tokyo (JP); Daido Metal Co., Ltd., Aichi (JP)

( * ) Notice: Subject to any disclaimer, the term of this patent is extended or adjusted under 35 U.S.C. 154(b) by 503 days.

(21) Appl. No.: 12/617,080

(22) Filed: Nov. 12, 2009

(65) Prior Publication Data

US 2010/0142870 A1 Jun. 10, 2010

(30) Foreign Application Priority Data

Nov. 12, 2008 (JP) ................. 2008-289580

(51) Int. Cl.
*F16C 17/00* (2006.01)
*F16C 27/00* (2006.01)
(52) U.S. Cl. .............. 384/311; 384/215; 384/322
(58) Field of Classification Search .......... 384/117, 384/119, 122, 124, 215, 224, 306–312, 322, 384/369, 428
See application file for complete search history.

(56) References Cited

U.S. PATENT DOCUMENTS

| | | | |
|---|---|---|---|
| 5,743,657 A | 4/1998 | O'Reilly et al. | |
| 6,361,215 B1 * | 3/2002 | Wilkes et al. | 384/117 |
| 7,237,957 B2 * | 7/2007 | Geiger | 384/312 |
| 2009/0310896 A1 * | 12/2009 | Bang et al. | 384/307 |

FOREIGN PATENT DOCUMENTS

| | | |
|---|---|---|
| JP | 58-37312 | 3/1983 |
| JP | 58-180814 | 10/1983 |
| JP | 2-87117 | 7/1990 |
| JP | 5-26230 | 2/1993 |
| JP | 5-332355 | 12/1993 |
| JP | 9-133127 | 5/1997 |
| JP | 10-503827 | 4/1998 |
| JP | 2000-274432 | 10/2000 |
| JP | 2003-176818 | 6/2003 |
| JP | 2004-100729 | 4/2004 |
| JP | 2006-112499 | 4/2006 |

OTHER PUBLICATIONS

International Preliminary Report on Patentability issued on May 17, 2011 in International Application No. PCT/JP2009/069188 (and English translation thereof issued on Jun. 21, 2011).

* cited by examiner

*Primary Examiner* — James Pilkington
(74) *Attorney, Agent, or Firm* — Wenderoth, Lind & Ponack, L.L.P.

(57) ABSTRACT

A journal bearing includes a bearing platform, a cylindrical bearing housing supported by the bearing platform via a plurality of load supporting members, a plurality of pads located swingable in the bearing housing so that a journal of a rotation shaft is supported by the pads, an oil supply mechanism for supplying oil to the bearing surfaces of the pads, and a connecting member which has an oil hole to communicate an oil supply passage in the bearing platform with an oil supply passage in the bearing housing so that oil is supplied from the bearing platform to the bearing surfaces of the pads. The connecting member carries a part of a bearing load exerted from the bearing housing, and is mounted such that the part of the bearing load carried by the connecting member is smaller than a bearing load carried by one of the load supporting members.

7 Claims, 9 Drawing Sheets

C - C section

C - C section

B - B section

View in the direction of arrow A

D - D section

Z: Mechanical loss which is the sum of frictional loss due to side seals, and agitation loss between pads Y: Frictional loss due to upper pads X: Frictional loss due to lower pads

JOURNAL BEARING

TECHNICAL FIELD

The present invention relates to a journal bearing of pad type for supporting a journal of a rotation shaft of rotating machines, and can be preferably applied to large size rotating machines such as steam turbines, gas turbines, and electric generators.

BACKGROUND ART

A self-aligning journal bearing having tiling pads has been used as a journal bearing of a large size rotating machine.

A journal bearing having tilting pads devised by the applicant of this application is disclosed in patent literature 1 (Japanese Laid-Open Patent Application No. 5-332355). As disclosed in the patent literature 1, each of the tilting pads is supported by means of a spherical pivot and an adjusting liner received in a recess defined in the back side face of the tilting pad and in a recess defined in the inner side face of the bearing housing such that the pad is swingable about an axis parallel with the rotation shaft (circumferentially swingable) and about a direction perpendicular to the axial direction of the rotation shaft (axially swingable). As the pads are swingable circumferentially and axially in accordance with the movement of the journal, a journal bearing of tilting pad type has self-aligning function.

Therefore, it can support a journal stably and is preferably adopted for high speed rotating machines.

The spherical pivot is received in both the recess in the tilting pad and the recess in the bearing housing so that it serves as a stopper of the tilting pad, i.e. the tilting pad is prevented from being dragged circumferentially by the rotation of the journal.

In a tilting pad journal bearing disclosed in patent literature 2 (Japanese Patent Publication No. 10-503827), a tilting pad supporting structure comprised of a locating socket and locating means comprising a spigot member and platform body is adopted to inhibit displacement of the pad in a circumferential direction when the shaft is in motion.

There are two types of tilting pad journal bearing, i.e., oil flooded lubrication type and direct lubrication type. In the oil flooded lubrication type, both axial end sides of the tilting pad are sealed so that spaces between a tilting pad and the adjacent tilting pad are flooded with lubrication oil. With this type, mechanical efficiency decreases due to friction loss of the side seals and agitation loss of oil in the spaces between the tilting pads.

Occurrence of decrease of mechanical efficiency will be explained referring to FIG. 8 quoted from the patent literature 1. FIG. 8 is a graph showing a relation between mechanical loss and rotation speed of journal in a journal bearing of oil flooded type. In the graph, the total mechanical loss increases nearly proportional to the square of the rotation speed. It consists of frictional loss X between the journal surface and bearing surfaces of the lower pads on which bearing load exerts, frictional loss Y between the outer circumference of the journal and bearing surfaces of the upper pads on which bearing load does not exerts, and mechanical loss Z which is the sum of the frictional loss due to the side seals and agitation loss of oil in the spaces between the pads due to agitation by the rotation of the journal.

Direct lubrication type of tilting pad radial bearing was proposed to eliminate the mechanical loss Z. In the direct lubrication type, oil supply nozzles are provided at the upstream side of each tilting pad upstream in relation to journal rotation direction and lubrication oil is supplied to the bearing surface of each tilting pad, and side seals are eliminated. Direct lubrication type is now widely adopted, as mechanical loss Z can be eliminated. The tilting pad journal bearing of the patent literature 1 is of direct lubrication type.

Another type of direct lubrication type tilting pad radial bearing is proposed in patent literature 3 (Japanese Laid-Open Patent Application No. 2000-274432). In a tilting pad journal bearing of direct lubrication type, there is a problem of so-called carryover of lubrication oil as recited in paragraph [0009] of the patent literature 3. This is a phenomenon that the lubrication oil lubricated the bearing surface of an upstream tilting pad is carried on the rotating journal to be introduced to the bearing surface of the adjacent downstream tilting pad.

Lubrication oil rises in temperature in the interstice defined by the circumferential surface of the journal and bearing surfaces of the tilting pad (hereunder referred to as bearing clearance of the tilting pad) due to shearing force in the lubrication oil in the interstice caused by the rotation of the journal. Lubrication oil increased in temperature in the bearing clearance of the upstream tilting pad is carried over to the bearing clearance of the adjacent downstream tilting pad, so the lubrication oil is further increased in temperature in the bearing clearance of the downstream tilting pad, which may cause overheat of the bearing surface of the tilting pad and bearing seizure.

Means of preventing carryover of lubrication oil in a direct lubricating type tilting pad journal bearing are proposed in the patent literature 3.

In patent literature 4 (Japanese Laid-Open Patent Application No. 2006-112499) is proposed another means of preventing excessive temperature rise of lubrication oil in a direct lubricating type tilting pad journal bearing. With this means, an oil supply nozzle is provided to the bearing housing at each of the upstream side end and downstream side end of a tilting pad in relation to the rotation direction of the journal, and a cooling path is formed in the pad circumferentially parallel with the bearing surface of the pad. A part of oil injected from the oil supply nozzle located at the downstream side end is directed to be introduced into the cooling path, thereby cooling the bearing surface of the tilting pad from under the bearing surface thereof to suppress temperature rise of the bearing surface.

As recited in paragraph [0004] of the patent literature 3, a bearing clearance of a tilting pad (clearance between the journal surface and bearing surface of the tilting pad) is filled with lubrication oil, the pad is supported by the stationary bearing housing, and the journal rotates at high speed in the oil filled in the clearance. Therefore, very large speed difference is developed in the oil between the bearing surface of the pad and journal surface. A wedge-form oil film is formed between the bearing surface of the pad and journal surface due to the speed difference, and oil pressure is generated in the oil film to support load exerted from the journal onto the bearing surface of the pad.

FIG. 9 (of the present application) is a quotation of FIG. 33 of the patent literature 3, showing pressure distribution in the lubrication oil film between the journal surface and bearing surface. In the drawing, a plurality of tilting pads $101a$~$d$ are disposed around the journal $100$ to support the journal $100$. Radial clearances $102$ between the journal $100$ and the tilting pads $101a$~$d$ are filled with lubrication oil. Integration of oil film pressures $F_p$ exerting to the bearing faces of the pads coincides with the bearing load W.

High oil film pressure is generated by the effect of wedge shape of the oil film narrowing the radial clearances 102 downstream of rotation direction of the journal due to tilting the each tilting pads 101a~d.

As shown in FIGS. 1, 3, and 6 of the patent literature 1, a plurality of bearing housing supporting liners (spherical liners) are provided between the bearing housing and bearing platform (including bearing casing and bearing cap) to fixedly support the bearing housing to the bearing platform by the intermediary of the spherical liners. Each of the spherical liners is provided such that its circumferential position coincides with each of the spherical pivots so that bearing load exerted on each of the tilting pads is supported by the bearing platform by the intermediary of each of the spherical liners between the bearing housing and bearing platform, thereby securing firm supporting of the bearing housing by the bearing platform.

On the other hand, lubrication oil is supplied from the bearing platform passing through an oil hole drilled in the spherical liner to the oil passage in the bearing housing to be supplied to the bearing surfaces of the tilting pads.

However, when the bearing load supporting member is provided with an oil hole to introduce lubrication oil, rigidity of the load supporting member decreases, and as a tilting pad supporting member is located at radially inwardly opposite position behind the bearing housing as can be seen in the patent literatures 1 and 2, structure of this part becomes complicated. Further, it is necessary to increase the thickness of the bearing housing in order to compensate for the decrease in rigidity of the load supporting member, which will lead to increase in size of the journal bearing.

In FIG. 6 of the patent literature 1 is shown such an example that a separate load supporting member (spherical liner located at a position vertically under the journal behind the bearing housing) is provided apart from load supporting members and an oil hole is provided in the separate load supporting member. As the oil hole is located at the space between adjacent tilting pads, rigidity of the bearing housing to support the journal decreases.

Generally, four load supporting members are located along the circumference of the bearing housing at equal spacing, however, when five load supporting members are provided as in the case of FIG. 6 of the patent literature 1, high accuracy in assembling is necessary to effect equal load sharing for the five load supporting members.

Patent literature 1: Japanese laid-open Patent Application No, 5-332355.

Patent literature 2: Japanese Patent publication No. 10-503827.

Patent literature 3: Japanese laid-open Patent Application No. 2000-274432.

Patent literature 4: Japanese laid-open Patent Application No. 2006-112499.

SUMMARY OF THE INVENTION

The present invention was made in light of problems of the prior art mentioned above, an the object of the invention is to provide a oil supply mechanism which enables reliable supply of lubrication oil to the bearing surfaces of tilting pads without leading to decrease in rigidity and increase in size of the journal bearing while retaining facility of assembling the bearing.

To attain the object mentioned above, the present invention proposes a journal bearing having a bearing platform, a cylindrical bearing housing supported by the bearing platform by the intermediary of a plurality of load supporting members provided between the bearing platform and the bearing housing, a plurality of pads located inside the bearing housing swingablly so that a journal of a rotation shaft is supported by the pads capable of being self-aligning, and oil supply means for supplying lubrication oil to the bearing surfaces of the pads, wherein a connecting member is provided between the bearing platform and the bearing housing at a position circumferentially apart from one of said load supporting members, said connecting member having an oil hole to communicate an oil supply passage in the bearing platform, which is an upstream oil passage, with an oil supply passage in the bearing housing, which is a downstream oil passage, so that lubrication oil is supplied from the bearing platform to the bearing surfaces of the pads, said connecting member also serving to carry a part of bearing load exerted from the bearing housing, and said connecting member is mounted to said position in such a manner that said part of bearing load carried by the connecting member is smaller than a bearing load carried by one of the load supporting members.

In the invention, a connecting member is provided between the bearing platform and bearing housing at a position circumferentially apart from one of the load supporting members separately in addition to the load supporting members, and the load supporting member is not provided with an oil hole in order to prevent decrease in rigidity thereof, instead the connection member is provided with an oil hole. As a result, increase of radial thickness of the bearing housing to compensate for the reduction in rigidity of the load supporting member becomes unnecessary.

Further, as the connecting member is mounted in such a manner that the load that the connecting member receives from the bearing housing is smaller than the load received by the load supporting member for the purpose of reducing the burden share of connecting member to support the bearing load and the number of the load supporting member is not increased, easiness of assembling the journal bearing can be retained.

In the journal bearing of the invention, it is preferable that the connecting member is located between the bearing platform and lower bearing housing which is loaded with the self weight of the rotation shaft. There is a case that the upper bearing housing is produced as an upper half separate from the lower bearing housing and assembled as a cover member to cover the lower bearing housing, so it is not suited to provide the connecting member thereon. Further, there is a case that the upper bearing platform is not provided.

Further, as the self weight of the rotation shaft does not exert on the upper bearing housing, when the connecting member is provided to the upper bearing housing, it is difficult to eliminate occurrence of oil leakage from the oil hole of the connecting member, and furthermore, it is not easy to make adjusting so that the load carried by the connecting member becomes smaller than the load exerted on the bearing platform from the bearing housing by the intermediary of the load supporting member.

On the other hand, as the self weight of the rotation shaft is exerted on the lower bearing housing, it is easy to make adjustment so that the load carried by the connecting member becomes smaller than the load carried by the load supporting member to be exerted on the bearing platform when the connecting member is provided to the lower bearing housing. Therefore, it is easier for assembling to locate the connecting member between the lower bearing housing and bearing platform.

It is preferable that an elastic member such as an O-ring is placed between the connecting member and bearing platform, thereby the connecting member being mounted so that a part of bearing load carried by the connecting member becomes smaller than bearing load carried by one of the load supporting members.

By mounting the connecting member between the lower bearing housing and bearing platform by the intermediary of an elastic member such as an O-ring, it becomes easier to adjust the load carried by the connecting member to support the bearing housing, and also assembling of the journal bearing is facilitated.

It is preferable to compose the journal bearing of the invention such that it is of a direct lubrication type in which lubrication oil is supplied to the bearing surfaces of the pads from oil supply nozzles located upstream of each of the pads in relation to rotation direction of the journal, wherein the downstream oil passage comprises a first oil hole communicating to the oil hole of the connecting member and a second oil passage communicating to nozzle holes of the oil supply nozzles.

With this construction, lubrication oil introduced from the bearing platform into the bearing housing through the oil hole drilled in the connecting member is supplied to the oil supply nozzles through the first oil passage and second oil passage in the bearing housing without decreasing rigidity of the bearing housing and with simple construction.

According to the invention, the journal bearing having a bearing platform, a cylindrical bearing housing supported by the bearing platform by the intermediary of a plurality of load supporting members, a plurality of pads located swingablly in the bearing housing so that a journal of a rotation shaft is supported by the pads capable of being self-aligning, and oil supply means for supplying lubrication oil to the bearing surfaces of the pads, is composed such that a connecting member is provided at a position apart from one of said load supporting members in the circumferential direction of the bearing housing between the bearing platform and the bearing housing, said connecting member having an oil hole to communicate an oil supply passage which is an upstream oil passage in the bearing platform with an oil supply passage which is a downstream side oil passage in the bearing housing so that lubrication oil is supplied from the bearing platform to the bearing surfaces of the pads, said connecting member also serving to carry a part of bearing load exerted from the bearing housing, and said connecting member is mounted to said position in such a manner that said part of bearing load carried by the connecting member is smaller than bearing load carried by one of the load supporting members. With this construction, lubrication oil is supplied to the bearing surfaces of the pads without decreasing bearing load supporting rigidity of the bearing housing, as a result, it becomes unnecessary to increase the radial thickness of the bearing housing, and also it is unnecessary to increase the number of the load supporting members located between the bearing platform and bearing housing, and easiness of assembling the journal bearing is retained.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
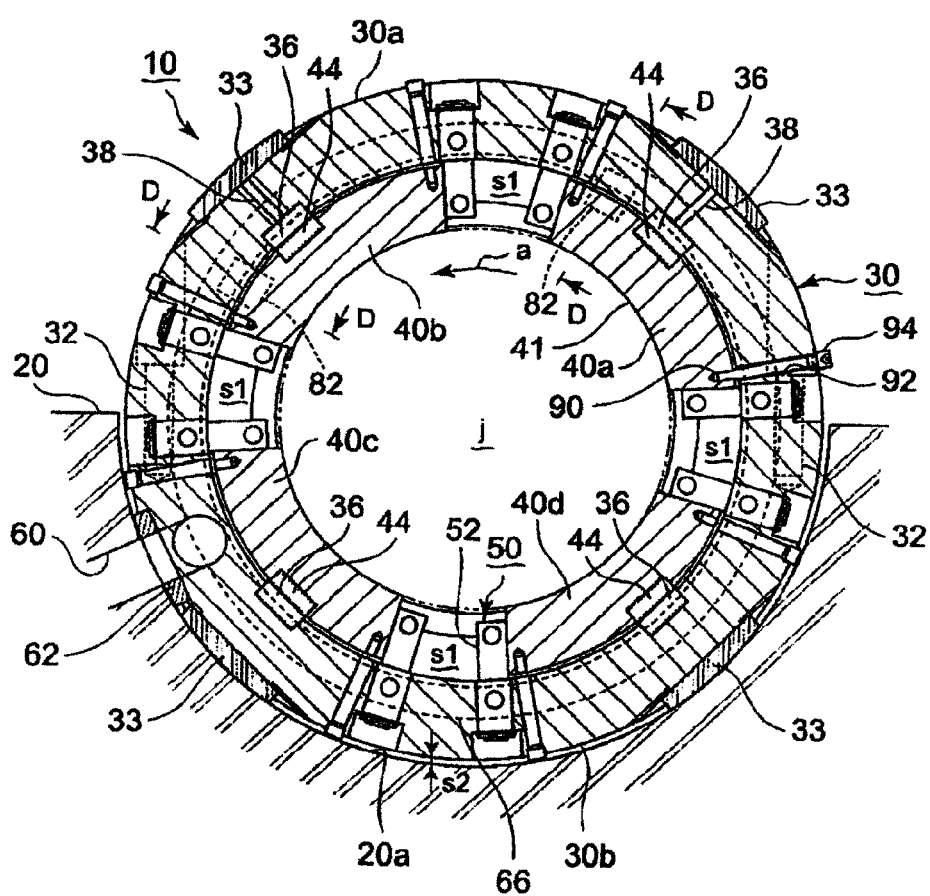
FIG. 1 is a sectional front view of an embodiment of the journal bearing of the present invention (C-C section in FIG. 2).
Figure 2:
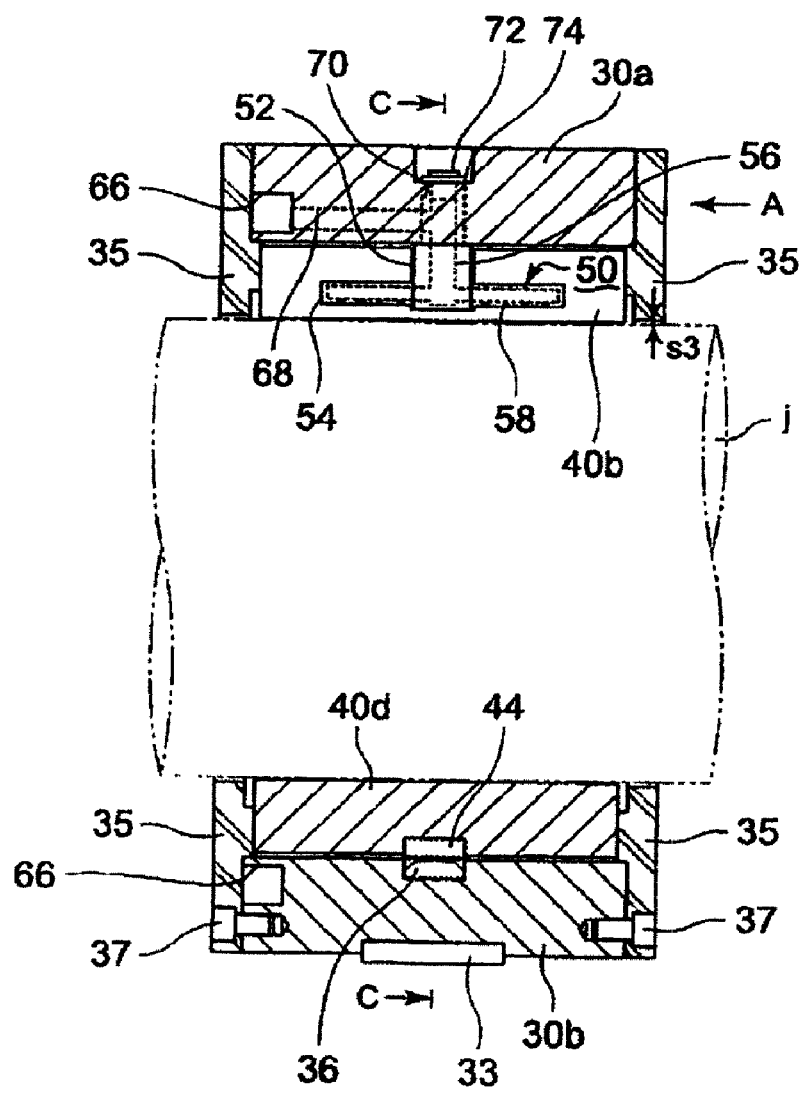
FIG. 2 is a sectional side view of the embodiment of FIG. 1 (B-B section in FIG. 3).
Figure 3:
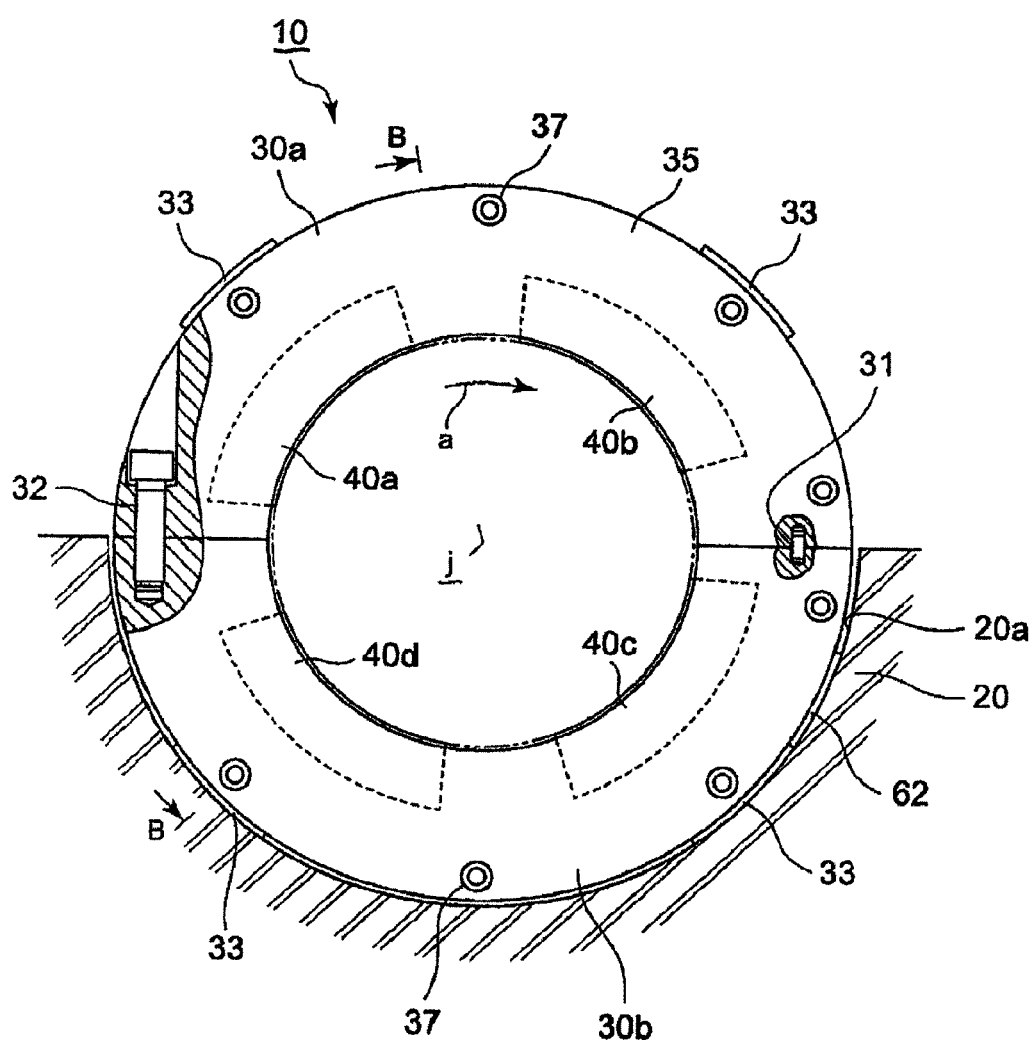
FIG. 3 is a rear view of the embodiment of FIG. 1 (view in the direction of arrow A in FIG. 2).

FIGS. 1~3 show an embodiment of the journal bearing of the invention, FIG. 1 is a sectional front view along line C-C in FIG. 2, FIG. 2 is a sectional side view along line B-B in FIG. 3, and FIG. 3 is a rear view viewed in the direction of arrow A in FIG. 2.

In FIG. 1, a journal j is that of a rotation shaft of large rotating machine such as a steam turbine, gas turbine, and an electric generator. The diameter of the journal j is as large as about 40 cm, so the journal bearing 10 to support the journal j becomes large in size, and circumferential velocity of the journal j becomes high. The journal j rotates in the direction of arrow a.

The journal bearing 10 supporting the journal j is comprised of a bearing platform 20, a bearing housing 30 comprising an upper semi-cylindrical housing 30a and a lower semi-cylindrical housing 30b fixedly supported by the bearing platform 20, and four tilting pads 40a~d attached to the inner circumferential surface of the bearing housing 30. Hereunder, suffixes a~d will be omitted when matter common to all of the tilting pads is recited. This is similarly applied to other constituent parts.

The bearing platform 20 has a concave part 20a semicircular in section, and the bearing housing 30 is cut in two halves of the upper bearing housing 30a and lower bearing housing 30b. The lower bearing housing 30b is supported by the semicircular concave part 20a of the bearing platform 20. The upper bearing housing 30a is positioned by means of a positioning pin 31 to the lower bearing housing 30b and connected to the lower bearing housing 30b by means of fastening bolts 32 as shown in FIG. 3.

Figure 4:
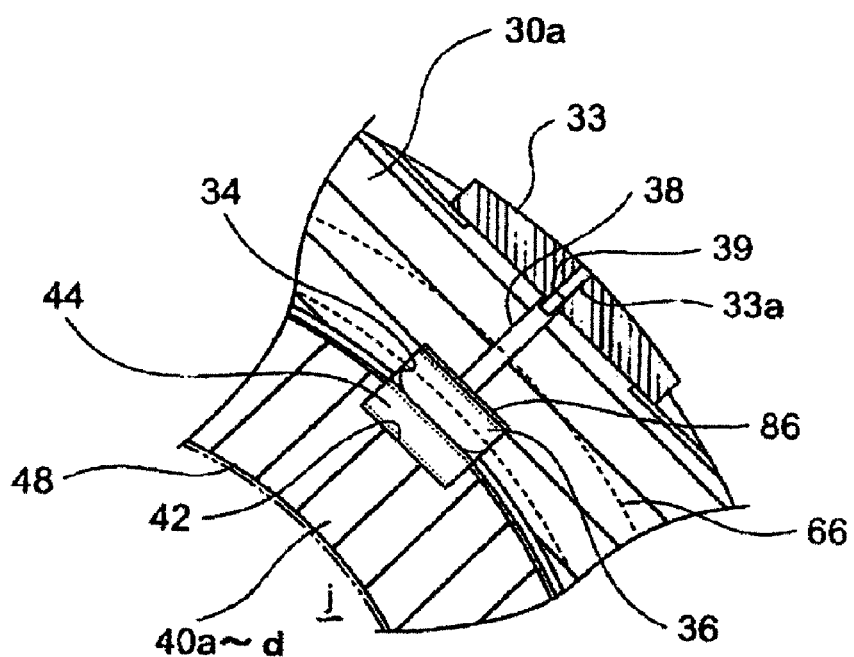
FIG. 4 is a partial enlarged sectional view near the spherical pivot 36 in FIG. 1.

As shown in FIG. 4, a recess 42 is provided in the back face (outer face) of each of the tilting pads 40 near the center part thereof, and an adjusting liner 44 is press fit in the recess. A recess 34 is formed in the inner face of the bearing housing 30 at a position facing the adjusting liner 44, and a spherical pivot 36 is inserted in the recess.

The surface of the spherical pivot 36 facing the adjusting liner 44 is formed into a spherical surface so that the tilting pad 40 is circumferentially and axially swingable in relation to the journal j.

As shown in FIG. 1, the tilting pads 40 are located such that a circumferential spacing s1 is provided between each of the pads. The spherical pivots 36 are located such that their centers are at positions 45° from the vertical center line or horizontal center line of the journal bearing.

As shown in FIG. 4, the spherical pivot 36 is received in the recess 34 such that the top of its spherical surface is level with the inner circumferential surface of the bearing housing 30. Therefore, the tilting pad 40 can be removed from the bearing assembly with the adjusting liner 44 fixed in the recess 42 thereof by removing a side plate mentioned later and sliding the tilting pad in the axial direction of the journal.

Radial holes for measurement 38 are drilled in the upper bearing housing 30a penetrating the upper bearing housing 30a from the outer periphery thereof to the recesses 34. An outer liner 33 (a bearing load supporting member/bearing load supporting medium) is provided on the outer periphery of the bearing housing 30 at a circumferential position thereof radially opposite behind the bearing housing 30 to the spherical pivot 36 located in the recess 34 in the inside face of the bearing housing 30. A hole 33a is drilled in the outer liner 33 to communicate with the hole for measurement 38. The hole for measurement 38 is plugged by a plug 39 after measurement mentioned later is finished.

The outer liner 33 is attached to the outer periphery of the bearing housing 30 by means of fastening bolts not shown in the drawings. The outer periphery of the outer liner 33 protrudes a little from the circumferential surface of the bearing housing 30.

Therefore, the outer liner 33 contacts the concave surface 20a of the bearing platform 20, and the lower bearing housing 30b is supported by the bearing platform 20 via the medium of the outer liner 33. There is a radial clearance s2 between the concave surface 20a of the bearing platform 20 and the outer surface of the lower bearing housing 30b.

As shown in FIG. 2, annular side plates 35 are attached to both side ends of the bearing housing 30 to retain the tilting pads between the inner circumferential surface of the bearing housing and the rotating surface of the journal j. As shown in FIG. 3, the annular side plates 35 are fixed to both sides of the bearing housing 30 by means of a plurality of fastening bolts 37. There is a radial clearance s3 between the inner periphery of the annular side plate and the rotating surface of the journal j. Lubrication oil injected from oil supply nozzles 50 is drained through the radial clearance s3 after the lubrication oil served to lubricate between the journal j and pads 40.

Figure 5:
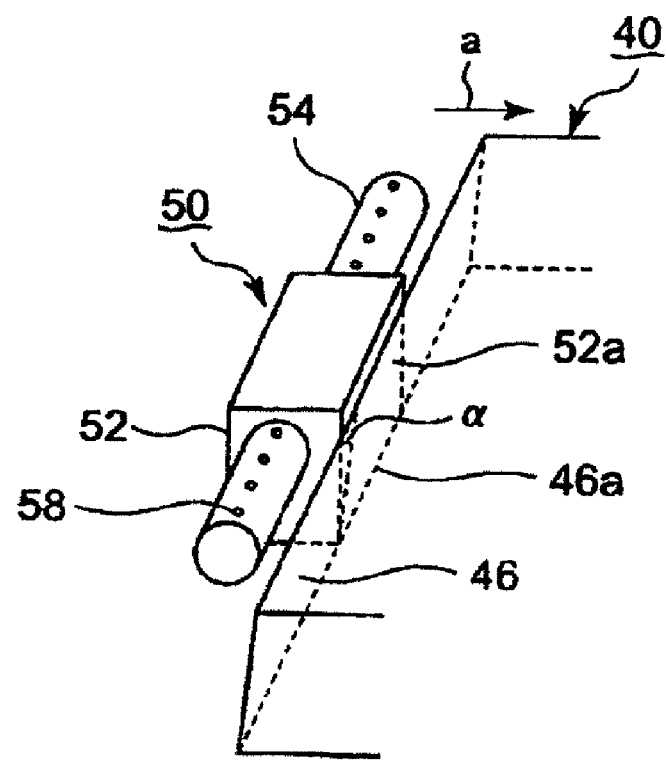
FIG. 5 is a perspective view of the oil supply nozzle 50 of the embodiment of FIG. 1.

As shown in FIG. 1, the oil supply nozzles 50 for injecting lubrication oil are attached to the bearing housing 30 to be located at both end sides of each of the tilting pads 40, that is, located at the upstream side and down stream side in relation to the rotation direction of the journal j. FIG. 5 shows an example of the oil supply nozzle 50 in a perspective view. Hereunder, structure of the oil supply nozzle 50 will be explained referring to FIG. 2 and FIG. 5. The oil supply nozzles located in the upstream side are same in construction as those located in the downstream side.

The oil supply nozzle 50 consists of a main casing 52 and nozzle arms 54. The main casing 52 has a rectangular parallelpiped part and cylindrical part. The nozzle arms 54 extend from both side faces opposite to each other of the rectangular parallelpiped part. The cylindrical part is inserted into a radial hole 70 drilled at an axial center part of the bearing housing 30 so that the rectangular parallelpiped part is located adjacent to the circumferential side end of the tilting pad 40 and the nozzle arms 54 extend in the axial direction of the journal j. The main casing 52 and arms 54 have a hollow 56 into which lubrication oil is introduced.

Each of the nozzle arms 54 has a plurality of nozzle holes 58 at equal spacing along the arm so that the nozzle holes 58 face toward the journal j along the axial direction thereof when the oil supply nozzle 50 is attached to the bearing housing 30. Lubrication oil injected from the nozzle holes 58 of the oil supply nozzle 50 located in the upstream side of the tilting pad 40 in relation to rotation direction of the journal j intrudes into the radial clearance between the inner circumferential surface of the tilting pad 40 (bearing surface 48 in FIG. 4) and the rotating surface of the journal j dragged by the rotation of the journal j to form oil film there.

Lubrication oil injected from the nozzle holes 58 of the oil supply nozzle 50 located in the downstream side of the tilting pad 40 in relation to rotation direction of the journal j cools the lubrication oil passed through the clearance between the bearing surface of the tilting pad and rotating surface of the journal j (oil clearance between the journal and tilting pad) and concurrently disrupts the oil film adhered on the rotating surface of the journal j to make the oil film to be separated therefrom. By this, intrusion of lubrication oil dragged by the rotation surface of the journal from the oil clearance between the journal and upstream tilting pad into the oil clearance between the journal and downstream tilting pad next to said upstream tilting pad is prevented. Lubrication oil flowed out from the downstream end of the tilting pad is drained through the radial clearance s3 between the side plate 35 and journal j.

As shown in FIG. 5, the main casing 52 is attached to the bearing housing such that a face 52a of the rectangular parallelpiped part thereof facing the tilted surface 46 of the tilting pad 40 contacts a base part-46a of the tilted surface 46 of the tilting pad 40, and tilted surface 46 skews by a small angle α so that the clearance between the tilted surface 46 and the face 52a increases radially inwardly. In this way, the base part 46a of the tilted surface 46 of the tilting pad 40 is supported at the face 52a of the main casing 52 in a form of line-contact, thereby the oil supply nozzle 50 supports immovably the movement of the tilting pad in the direction of the journal rotation.

Figure 6:
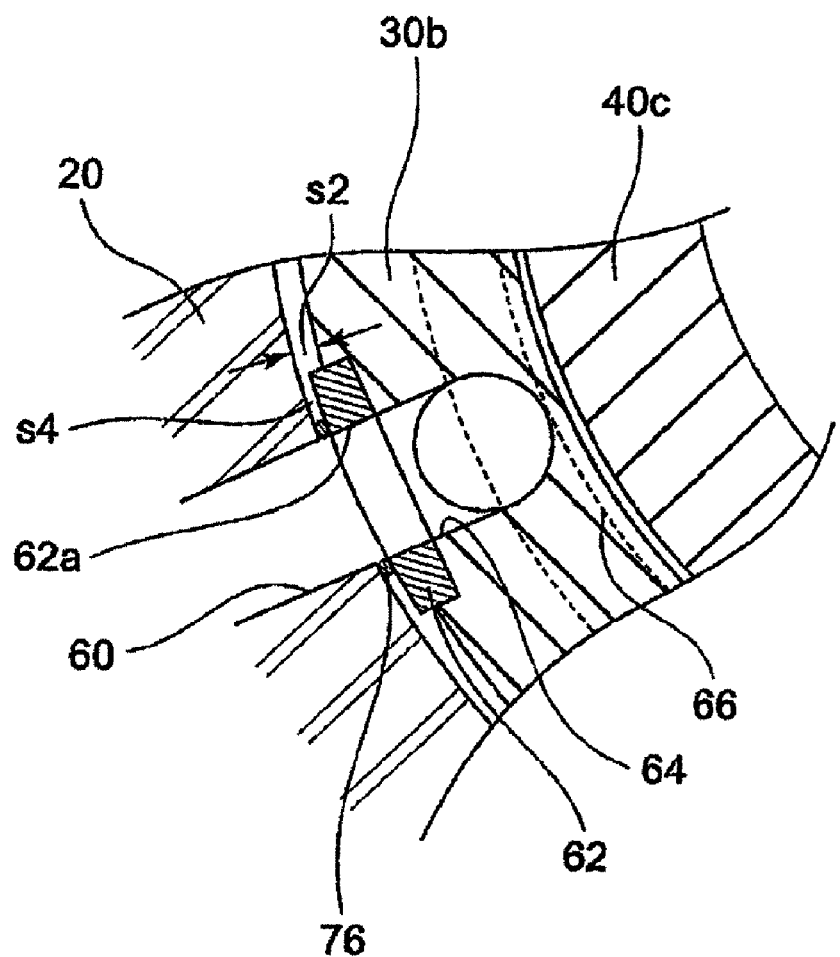
FIG. 6 is a partial enlarged sectional view near the oil supply hole 60 in FIG. 1.

As shown in FIG. 1, an oil supply hole 60 (an oil supply passage) is provided in the bearing platform 20. An outer liner 62 (a connecting member) is located on the outer periphery of the lower bearing housing 30b at a position facing the oil supply hole 60. Configuration of this portion will be explained referring to FIG. 6. In FIG. 6, the outer liner 62 has an oil supply hole 62a communicating to the oil supply hole 60.

An oil supply hole 64 (a first oil supply hole) is drilled radially in the lower bearing housing 30b such that the oil supply hole 64 communicates to the oil supply hole 60 by way of the oil supply hole 62a of the outer liner 62. Annular oil groove 66 (an oil supply passage) is provided in an axial side face of the bearing housing 30.

The annular oil groove 66 runs all around the axial side end of the bearing housing 30. As shown in FIG. 2, the annular oil groove 66 is communicated to the hollow 56 of the main casing 52 of the oil supply nozzle 50 by an axial oil hole 68 (a second oil supply hole) in the bearing housing 30. The open end of the hollow 56 at the end of the cylindrical part of the main casing 52 is closed by a plug 72 and the plug 72 is secured by a C-shaped retaining ring 74.

A radial clearance s4 is formed between the inner circumferential surface of the bearing platform 20 and outer periphery of the outer liner 62 (see FIG. 6). An o-ring 76 is placed in the clearance s4 to seal the clearance. By this, oil leakage through the clearance s4 is prevented and concurrently the o-ring 76 serves so that a bearing load exerted on the bearing platform 20 from the lower bearing housing 30b by the intermediary of the outer liner 62 becomes smaller than a bearing load exerted on the bearing platform 20 from the lower bearing housing 30b by the intermediary of the outer liner 33.

Figure 7:
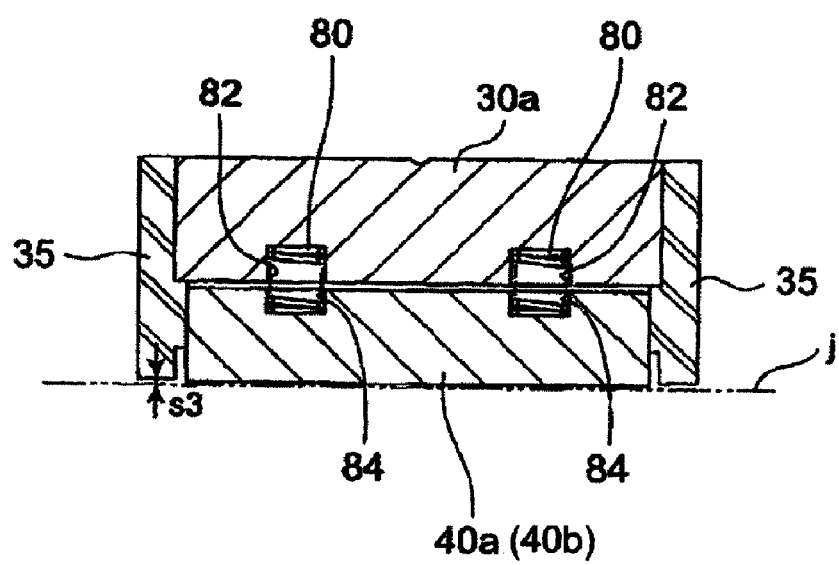
FIG. 7 is a sectional view along line D-D in FIG. 1.
Figure 8:
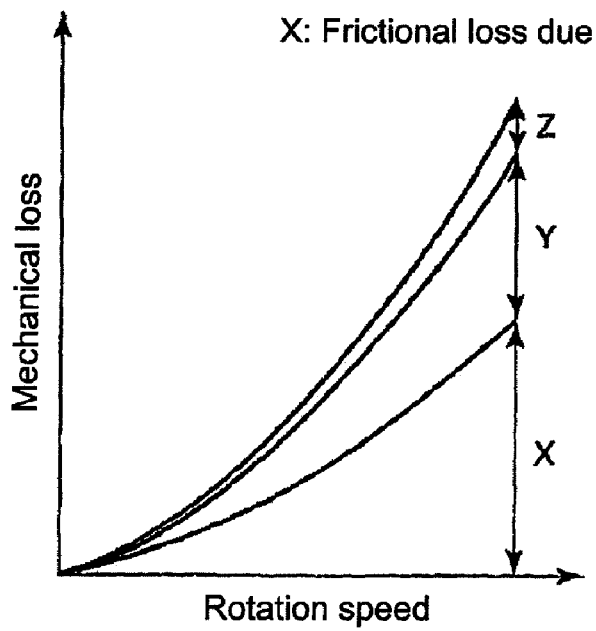
FIG. 8 is a graph showing mechanical loss in a tilting pad journal bearing of oil flooded type.
Figure 9:
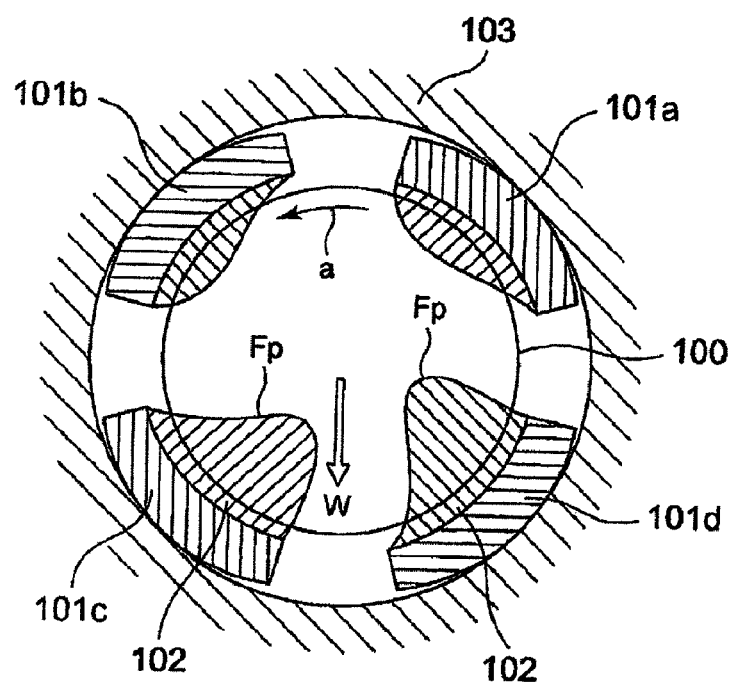
FIG. 9 is a drawing for explaining of formation of oil film pressure in the journal bearing due to wedge effect.

As shown in FIG. 7, two circular recesses 84 are provided in the outer circumferential surface of the tilting pads 40a and 40b at a certain spacing in the axial direction thereof and two circular recesses 82 in the circumferential surface of the upper housing 30a. Each of the circular recesses faces each other so that a cylindrical hollow is formed. The recesses 84 are provided near the downstream end of the tilting pads 40a and 40b in relation to the rotation direction of the journal j as can be seen in FIG. 1. In the cylindrical hollow formed by the two recesses facing each other is installed a coil spring 80, which pushes the tilting pad radially toward the journal j near the downstream side end thereof. Therefore, as shown in FIG. 9, it becomes easy that an oil clearance narrowing in the rotation direction of the journal j is formed between rotating surface of the journal and bearing surface of tilting pad 40a and 40b.

As shown in FIG. 1, radial screw holes 90 are provided near the upstream end part and downstream end part of each of the tilting pads 40 in relation to the rotation direction of the journal j. Radial through holes 92 are drilled in the bearing housing 30 where the radial though hole 92 faces the opening of the corresponding radial screw hole 90 so that the radial through hole 92 and the radial screw hole 90 has a same axis line. A hexagon socket head screw 94 is inserted through each of the radial through holes 92 and its fore-end part is screwed into each of the screw holes 90.

The radial clearance between the inner surface of the bearing housing 30 and the outer surface of the tilting pad 40 can be adjusted by adjusting screwed-in length of the hexagon socket head screws 94, thereby the radial clearance (bearing clearance) between the rotating surface of the journal and bearing surface of the tilting pad 40 can be adjusted.

In this manner, the upstream side radial clearance and downstream side radial clearance between the journal surface and bearing surface of the tilting pad can be adjusted separately, that is, the attitude of the tilting pad can be adjusted, to obtain a wedge-shaped radial clearance by a compact and inexpensive means.

In such an embodiment of the invention, lubrication oil is supplied from the oil supply hole 60 provided in the bearing platform 20 to the hollows 56 of the oil supply nozzles 50 through the annular oil groove 66 and axial oil hole 68 in the bearing housing 30. The lubrication oil is injected from the nozzle holes 58 of the nozzle arms 54 of the oil supply nozzle 50 toward the rotating surface of the journal j.

Lubrication oil injected from the oil supply nozzle 50 located at the upstream side of the tilting pad 40 in relation to the rotation direction of the journal j is introduced into the oil clearance between the journal and tilting pad to lubricate the rotating surface of the journal j and bearing surface 48. Lubrication oil injected from the oil supply nozzle 50 located at the downstream side of the tilting pad 40 in relation to the rotation direction of the journal j impinges against the rotating surface of the journal j, cools the lubrication oil risen in temperature in the oil clearance between the journal surface and bearing surface of the upstream tilting pad adhering on the rotating surface of the journal j, and disturbs the oil layer adhering on the rotating surface of the journal to prevent the high temperature oil layer adhered on the rotating surface of the journal from being carried into the oil clearance between the journal surface and bearing surface of the adjacent downstream tilting pad. By this, excessive temperature rise of the bearing surface 48 of the tilting pad 40 can be prevented and occurrence of bearing seizure is prevented.

Radial clearance between the journal surface and bearing surface 48 of the tilting pad can be adjusted to a desired clearance by measuring the distance from the rear face of the spherical pivot 36 to the open end of the radial hole for measurement 38 by means of a known measuring device and determine the radial clearance between the journal surface and bearing surface 48, and inserting an adjusting shim 86 in the recess 34 on the back face of the spherical pivot 36 based on the measurement.

By using this clearance adjusting means together with the clearance adjusting by the hexagon socket head screws 94, clearance between the journal surface and bearing surface of the tilting pad can be adjusted to a desired clearance with high accuracy such that the clearance becomes narrow toward the downstream side of the tilting pad in relation to the rotation direction of the journal as shown in FIG. 9. Therefore, high oil film pressure owing to the wedge effect can be generated easier on the bearing surface 48 and high performance of lubrication of the bearing surface 48 can be maintained.

Self weight of the rotation shaft exerts on the tilting pads 40c and 40d located on the lower bearing housing 30b, so a wedge-shaped radial clearance narrowing downstream as shown in FIG. 9 can be formed relatively easily. On the other hand, the self weight of the rotation shaft does not exerts on the tilting pads 40a and 40b located on the upper housing 30a, so the formation of high pressure oil film between the journal surface and bearing surfaces 48 of the upper tilting pads 40a and 40b can not be expected.

According to the embodiment, the downstream end part of each of the tilting pads 40a and 40b located on the upper bearing housing 30a are pushed downward by the elastic force of the coil springs 80, so wedge-shaped radial clearance narrowing downstream can be easily formed also in the upper tilting pads 40a and 40b. Therefore, high pressure oil film can be generated on the bearing surface of the upper tilting pads 40a and 40b by the wedge effect.

As the self weight of the rotation shaft does not exert on the upper tilting pads 40a and 40b, there has been a tendency that vibration of the upper tilting pad occurs in the bearing housing, which will cause occurrence of fatigue failure of the bearing surface of the tilting pad. This problem can be eliminated according to the embodiment.

Further, as the oil supply nozzles 50 are located at the upstream and downstream side of the tilting pad such that the tilting pad is stopped its movement in the circumferential direction by the main casing 52 of the oil supply nozzle 50, separate means for preventing movement of the tilting pad in the circumferential direction dragged by the rotation of the journal is not needed, and the journal bearing can be simplified in structure.

Further, as the tilting pad 40 is supported at the outer side periphery part 46a, the space in front and rear side of the tilting pad can be broaden, which enables to realize further stable supply of the lubricating oil.

Conventionally, the spherical pivot 36 is received in the recess of the bearing housing 30 such that it extends into the recess of the tilting pad 40 so that the spherical pivot 36 serves to prevent circumferential movement of the tilting pad 40. Such configuration is not needed according to the embodiment of the present invention. Therefore, by allowing the spherical surface of the spherical pivot to be level with the inner circumferential surface of the bearing housing 30, the tilting pad 40 can be drawn out axially along the journal j by only removing the side plate 35. Therefore, the tilting pad 40 can be removed with the journal in the place as it is, which facilitates removing and attaching of the tilting pad 40 when repairing or changing same.

Furthermore, according to the embodiment, by providing the outer liner 62 having the oil supply hole 62a which communicate with the oil supply hole 60 in the bearing platform 20 separately in addition to the outer liners 33, reduction of rigidity of the outer liner 33 if an oil hole is drilled to it as is in a conventional example of tilting pad journal bearing can be eliminated. Therefore, necessity of increasing radial thickness of the bearing housing to compensate for the reduction in rigidity of the outer liner can be eliminated.

Further, as the outer liner 62 is provided such that the load that the outer liner 62 receives from the bearing housing 30 is smaller than the load received by the outer liner 33, the oil supply hole 62a can be provided without increasing the number of the outer liner 33. Therefore, there is no change in the number of the outer liner 33, so there is no need to raise the dimensional accuracy of the outer liner 33, and easiness of assembling the journal bearing can be retained.

Further, as the outer liner 62 is provided to the lower bearing housing 30b on which the bearing load exerts from the journal j through the intermediary of the tilting pad 40, the bearing load which exerts on the lower bearing housing 30b can be adjusted easily by the outer liner 62, and in addition, as the o-ring 76 capable of elastic deformation is placed between the outer liner 62 and bearing platform 20, said adjustment of the bearing load is further facilitated.

Further, lubrication oil is supplied to the nozzle arms 54 of the oil supply nozzles 50 through the oil supply hole 60 in the bearing platform 20, annular oil groove 66, oil supply hole 68, and the hollow 56 in the main casing of the oil supply nozzle 50 with simple construction without decreasing the rigidity of the bearing housing 30.

The O-ring is used between the outer liner 62 and bearing platform 20 in the embodiment, however, other elastic member, for example, a bellow and so on may be used instead of the O-ring. By using an elastic member between the outer liner 62 and bearing platform like this, adjustment of the bearing load exerting on the bearing platform 20 from the bearing housing 30 through the outer liner 62 becomes easy.

INDUSTRIAL APPLICABILITY

According to the invention, a tilting pad type journal bearing provided with a means for supplying lubrication oil to the bearing surfaces of the tilting pads can be provided which can be constructed without leading to decrease in rigidity and increase in size of the journal bearing, in which lubrication oil can be supplied to the bearing surfaces of the pads with certainty, and which can be preferably adopted in large size rotating machines such as steam turbines, gas turbines, and electric generators.

The invention claimed is:

1. A journal bearing comprising:
   a bearing platform;
   a cylindrical bearing housing supported by the bearing platform via a plurality of load supporting members provided between the bearing platform and the bearing housing;
   a plurality of pads located inside the bearing housing swingable so that a journal of a rotation shaft is supported by the plurality of pads and is capable of being self-aligning; and
   an oil supply mechanism for supplying lubrication oil to bearing surfaces of the plurality of pads, the oil supply mechanism being provided with an oil supply nozzle having a plurality of nozzle holes,
   wherein a connecting member is provided between the bearing platform and the bearing housing at a position circumferentially apart from one of the plurality of load supporting members, the connecting member having an oil supply hole to communicate an oil supply passage in the bearing platform, which is an upstream oil passage, with an oil supply passage in the bearing housing, which is a downstream oil passage, so that lubrication oil is supplied from the bearing platform to the bearing surfaces of the plurality of pads,
   and wherein the connecting member is mounted to the position so as to carry a part of a bearing load exerted from the bearing housing, the part of the bearing load carried by the connecting member being smaller than a bearing load carried by one of the plurality of load supporting members.

2. A journal bearing according to claim 1, wherein the connecting member is located between the bearing platform and a lower portion of the bearing housing which is loaded with the weight of the rotation shaft.

3. A journal bearing according to claim 2, wherein the oil supply nozzle comprises a plurality of oil supply nozzles, wherein the journal bearing is of a direct lubrication type in which lubrication oil is supplied to the bearing surfaces of the plurality of pads from a respective one of the plurality of oil supply nozzles located upstream of each of the plurality of pads in relation to a rotation direction of the journal, wherein the downstream oil passage comprises a first oil supply hole communicating to the oil supply hole of the connecting member and a second oil supply hole communicating to the nozzle holes of the oil supply nozzles.

4. A journal bearing according to claim 2, further comprising:
   an elastic member placed between the connecting member and the bearing platform.

5. A journal bearing according to claim 4, wherein the oil supply nozzle comprises a plurality of oil supply nozzles, wherein the journal bearing is of a direct lubrication type in which lubrication oil is supplied to the bearing surfaces of the plurality of pads from a respective one of the plurality of oil supply nozzles located upstream of each of the plurality of pads in relation to a rotation direction of the journal, wherein the downstream oil passage comprises a first oil supply hole communicating to the oil supply hole of the connecting member and a second oil supply hole communicating to the nozzle holes of the oil supply nozzles.

6. A journal bearing according to claim 4, wherein the elastic member is an O-ring.

7. A journal bearing according to claim 1, wherein the oil supply nozzle comprises a plurality of oil supply nozzles, wherein the journal bearing is of a direct lubrication type in which lubrication oil is supplied to the bearing surfaces of the plurality of pads from a respective one of the plurality of oil supply nozzles located upstream of each of the plurality of pads in relation to a rotation direction of the journal, wherein the downstream oil passage comprises a first oil supply hole communicating to the oil supply hole of the connecting member and a second oil supply hole communicating to the nozzle holes of the oil supply nozzles.

* * * * *